Figure 1:
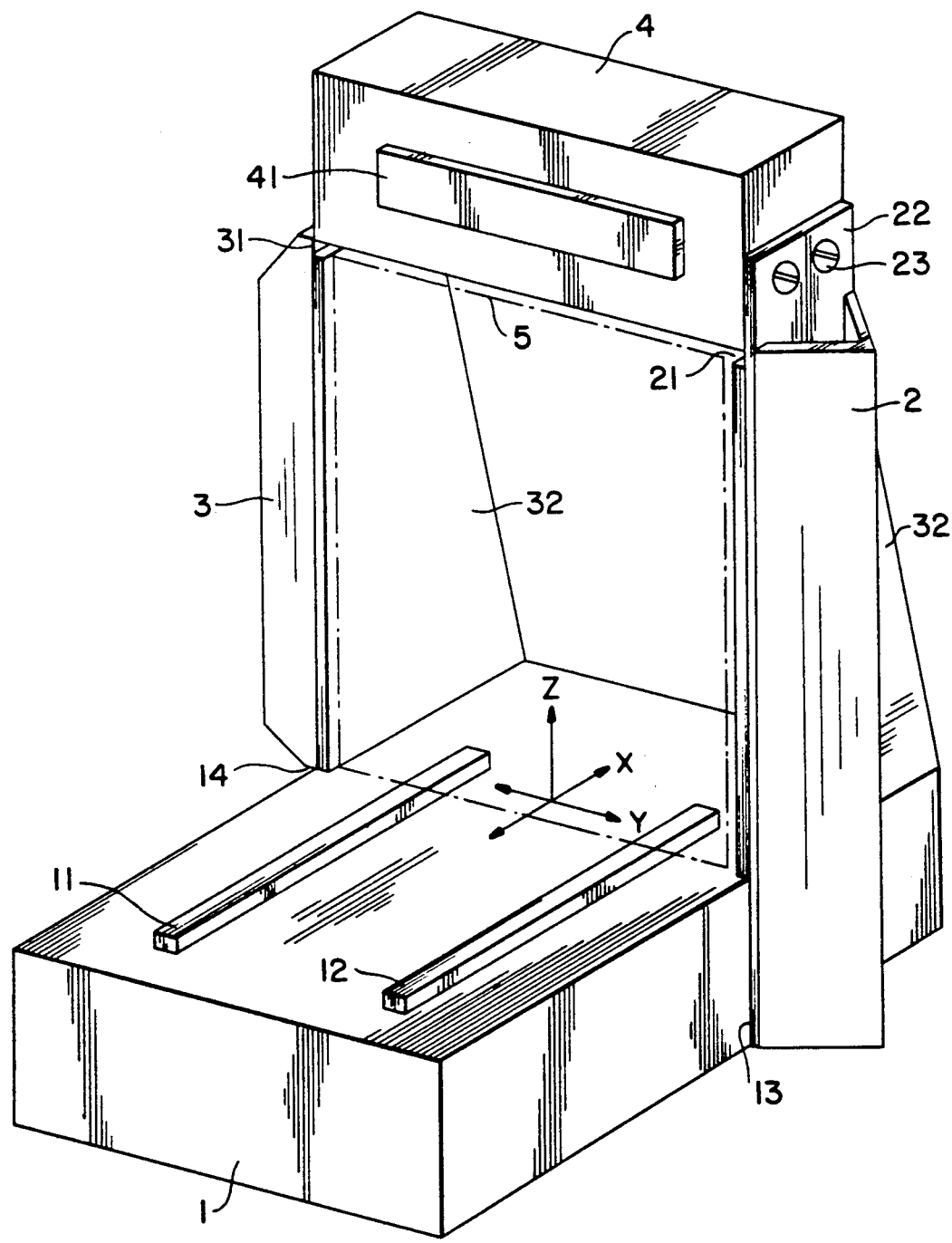

United States Patent [19]

Schalz et al.

[11] Patent Number: 5,119,566
[45] Date of Patent: Jun. 9, 1992

[54] STATIONARY GANTRY FOR A PRECISION COORDINATE MEASURING INSTRUMENT

[75] Inventors: Karl-Josef Schalz, Weilburg; Matthias Lindner, Bad Nauheim, both of Fed. Rep. of Germany

[73] Assignee: Leitz Messtecknik GmbH, Wetzlar, Fed. Rep. of Germany

[21] Appl. No.: 656,093

[22] PCT Filed: Jun. 21, 1990

[86] PCT No.: PCT/DE90/00471
§ 371 Date: Feb. 25, 1991
§ 102(e) Date: Feb. 25, 1991

[87] PCT Pub. No.: WO91/00493
PCT Pub. Date: Jan. 10, 1991

[30] Foreign Application Priority Data

Jun. 24, 1989 [DE] Fed. Rep. of Germany ....... 3920718

[51] Int. Cl.$^5$ ............................ G01B 5/03; G01B 7/03; G01B 21/04
[52] U.S. Cl. ..................................... 33/503; 33/572
[58] Field of Search ................ 33/503, 572, 556, 557, 33/558

[56] References Cited

U.S. PATENT DOCUMENTS

| | | | |
|---|---|---|---|
| 4,369,581 | 1/1983 | Lenz | 33/503 |
| 4,597,182 | 7/1986 | Rinn | 33/503 |
| 4,631,834 | 12/1986 | Hayashi et al. | 33/503 |
| 4,908,950 | 3/1990 | Bano et al. | 33/503 |

FOREIGN PATENT DOCUMENTS

| | | | |
|---|---|---|---|
| 3526317 | 2/1986 | Fed. Rep. of Germany. | |
| 2600764 | 12/1987 | France | 33/503 |
| 2231962 | 11/1990 | United Kingdom | 33/503 |

OTHER PUBLICATIONS

Zawistowski, "Compensated guages for big dimensions", Microtecnic, vol. XX, No. 6, 1986, pp. 612–614.
Bogolyubov et al., "Apparatus to Determine Coordinates of Large Curved Surfaces", Measurement Techniques, vol. 20, No. 7, Jul. 1977, pp. 979–982.
Patent Abstracts of Japan, vol. 6, No. 156, p. 135, 1034, Aug. 17, 1982 JP 57–73602.
Brochure entitled "LEITZ PMM 866, LETIZ PMM 12106", for the company Ernst Leitz Wetzlar GmbH, No. 810-096 published in 1981.
Handwoerterbuch der Technik (Pocket Dictionary of Techology) Kock, Kienzle, DVA Stuttgart+Berlin 1935, p. 310 and pp. 487–491.

*Primary Examiner*—Thomas B. Will
*Attorney, Agent, or Firm*—Foley & Lardner

[57] ABSTRACT

Stationary gantry for a precision coordinate measuring instrument comprising a base (1), a first (2) and a second (3) upright and a cross-member (4), in which three of the four connections between the base (1), first (2) and second (3) upright and cross-member (4) are embodied as rotatable connections (14, 21, 31). The design is thus no longer statically overdetermined. The joints (14, 21, 31) can be embodied as a strap connection in a sheet construction of the gantry parts (1, 2, 3, 4).

8 Claims, 1 Drawing Sheet

STATIONARY GANTRY FOR A PRECISION COORDINATE MEASURING INSTRUMENT

The invention relates to a stationary gantry for a precision coordinate measuring instrument comprising a base, a first and a second upright and a cross-member.

Such gantries are known (cf. brochure PMM 12106 from the firm Ernst Leitz Wetzlar GmbH 810-096, 1981).

In this arrangement, the base, uprights and cross-member form a frame around a rectangle in the x/z-plane, a cuboid in three dimensions. Conventionally, the components are designed and connected to one another in such a way that all the side lengths and all the angles are each individually fixed. The result is that all the connections between the base, uprights and cross-member are constructed flat and these surfaces must be aligned highly precisely in terms of angle. Since the rectangle is overdetermined by four sides and four angles, and thus also the cuboid, the result of the deviations, which cannot be ruled out whatever the outlay, is that it still remains necessary to use adjustment aids as connecting elements at the fourth connection.

A high outlay during parts production and installation of the gantry is thus unavoidable with this method of construction.

German Offenlegungsschrift 3,526,317 discloses a coordinate measuring instrument having a movable gantry, in which the gantry crossarm having adjusting devices and locking stops is connected to the supporting uprights. The design requires a great many precision parts. Geometrically, said gantry design is multiply overdetermined.

With the known embodiments, faults arise from strains and deformations due to installation and to thermal, static and dynamic mechanical stress. Because of the stiff connection of the components, these faults are always transferred to all the components of the design. The result is excessive complication both in the predetermination during construction and in the detection of the faults for correction during operation.

It is known in steel construction, for example, to provide crane gantries with a pendulum support. Again, bridges are fitted with partially elastic joints, cf. Handwörterbuch der Technik (Pocket Dictionary of Technology) Koch, Kienzle. DVA Stuttgart + Berlin 1935, page 310, page 487 ff. In accordance therewith, high mechanical and thermal loads are decisive, but the requirement for fixed geometry of the highest precision such as exists in the case of coordinate measuring machines does not obtain.

It is the object of the invention to specify a gantry according to the preamble, which can, by contrast with known embodiments, be produced with substantially less outlay and whose weight is substantially reduced, so that the cost of transport is also reduced and the possibilities of installation are widened, and whose behavior in the presence of disturbing stresses can be substantially more simply detected and described.

This object is achieved with a gantry according to the preamble when three of the four connections between the base, first and second upright and cross-member are rotatably embodied.

Advantageous embodiments are the subject of subclaims 2 to 8.

The invention proceeds from the perception that the problems in the known embodiment of the gantries result from the overdetermination, described at the beginning and regarded as unavoidable, of the rectangle or cuboid that is formed.

The solution is achieved by means of a design in which the rectangle that is formed is uniquely determined by four sides and only one angle. The design is then statically determined.

The invention is explained in more detail with reference to the drawing, wherein FIG. 1 shows a basic form, FIG. 2 shows a further embodiment.

FIG. 1 shows a view of a stationary gantry for a precision coordinate measuring instrument, which consists of a base 1, a first upright 2, a second upright 3 and a cross-member 4.

The base 1 has guideways 11, 12, embodied in a known way, for a sample slide (not represented) that can be moved in the x-direction. The cross-member 4 likewise has a known guideway 41 for a y-carriage (not represented), on which in turn a movable z-spindle having a contact probe can be mounted.

In principle, the connection 13 of the base 1 and first upright 2 is embodied in a known way, in particular in a rigid and flexurally stiff fashion. However, by contrast with known embodiments it is possible even here for the production outlay to be reduced, since the adaptation of the base 1 and first upright 2 to the connection 13 need not be precisely aligned with respect to the other connections of the gantry parts.

The connection 14 of the base 1 to the second upright 3, as also the connections 21 and 31 between the first upright 2 and, respectively, the second upright 3 and the cross-member 4 are rotatably embodied. The axes of rotation of these connections 14, 21, 31 are situated in this arrangement largely perpendicular to the plane of the quadrilateral 5, which is set up by the gantry parts 1, 2, 3, 4, or parallel to the plane set up by the guideways 11, 12.

The rotatable connections 14, 21, 31 can be embodied in the fashion of hinges.

However, the embodiment as an elastic connecting element, in particular as a simple strap connection 22 as represented by the example of the connection 21 in the drawing is especially advantageous. This is possible since only the very smallest angles of rotation occur. This provides a further simplification of the design. The production of the hinge parts is eliminated. The alignment of the hinge parts in accordance with the desired axis of rotation is likewise eliminated. The axis of rotation is aligned automatically in the strap connection 22 in accordance with the stress of the connection.

The straps 22 can be constructed as simple extensions of the uprights 2, 3 or of the cross-member 4, in particular if the latter are constructed as hollow box girders in a welded sheet construction.

The installation can then be performed by means of screw connections 23 between the cross-member 4 and strap 22 on the upright 2.

A simple adjustment is produced by means of longitudinal holes on the screw connections 23.

For the purpose of installation, the position of the guideway 41 on the cross-member 4 with respect to the guideways 11 and 12 on the base 1 can be determined by means of a gauge frame. The connections 21 and 31 are then produced in this position, in particular by means of screws 23 of the straps 22.

Since, due to the introduction of the joint connections 14, 21, 31, it is no longer necessary for highly accurate surfaces, aligned precisely with respect to one another, to be machined on the uprights 2 and 3 and the cross-member 4 in the end regions of the beam structures, and since the high loads no longer occur during machining, demands placed on the stiffness of the parts can be reduced. As a result, it is possible to go over to a lightweight construction using welded constructions of hollow box girders made of sheet metal. The uprights 2, 3 are then, e.g., embodied as triangular hollow sectional girders having a trapezoidal stiffening 32 against deformations in the x-direction.

As mechanical structures, the base 1, the uprights 2, 3 and the cross-member 4 are subjected to deformations due to static and dynamic loads and to temperature effects, which are transferred to the whole gantry and lead to displacements and thus to measuring errors of the contact prod with respect to the sample on the precision coordinate measuring instrument. It is therefore known that these faults must be reduced to a minimum by design and choice of material. With the design described, filling with concrete polymer can, for example, also be useful.

The measuring accuracy can then be further increased by detecting the remaining faults and deformations and determining corrections of the measured values via model calculations or experimental data records.

In this regard, the gantry design with three joint connections, as represented here, has the considerable advantage that the individual components of the base 1 together with first upright 2, second upright 3 and cross-member 4 are decoupled in such a way that the deformations for each component can be determined individually and then be simply combined additively to the total effect.

If, for example, the cross-member 4 assumes a higher temperature than the remaining components 1, 2, 3, the effect of this is an extension. As a result, only the second upright 3 is deflected laterally. Neither the second upright 3 nor the cross-member 4 are deformed. Since no restoring force acts from the second upright 3 on the cross-member 4, it is also impossible for any force to be exerted on the first upright 2, which is rigidly connected to the base 1, so that said upright 2 is not deformed either.

The temperature rise in the cross-member 4 thus effects only a simple linear displacement of the probe in the y-direction, which can easily be corrected.

In FIG. 1, the base 1, uprights 2, 3 and cross-member 4 are essentially embodied as prismatic columns or beams, and the rotatable connections are situated in the corners of one of these rectangles set up. However, the invention is not restricted to such an embodiment.

FIG. 2 shows that the parts 10, 20, 30 and 40 can be curved, kinked or cranked, the cross-sectional area set up thereby can deviate substantially from the rectangle with regard to number and angle of the corners, and the rotatable connections 120, 240 and 340 can form in the basic position an angle other than 90°, e.g. also 135° and 180°. An analogous result holds for the rigid connection 130.

The rotatable connections 120 and 240 are constructed as ball joints or biaxial swivel joints, so that the design is also no longer overdetermined spatially and thus, e.g., torsional loading of the cross-member 40 about the y-axis due to installation errors or thermal expansion is ruled out.

I claim:

1. Stationary gantry for a precision coordinate measuring instrument comprising a base (1), a first (2) and a second (3) upright and a cross-member (4), characterized in that three of the four connections between the base (1), first (2) and second (3) upright and cross-member (4) are embodied as rotatable connections (14, 21, 31).

2. Stationary gantry for a precision coordinate measuring instrument according to claim 1, characterized in that at least one rotatable connection (14, 21, 31) is realized by means of an elastically deformable element.

3. Stationary gantry for a precision coordinate measuring instrument according to claim 2, characterized in that at least one rotatable connection (14, 21, 31) is embodied as a flexible strap connection (22).

4. Stationary gantry for a precision coordinate measuring instrument according to claim 1, characterized in that the uprights (2, 3) and/or the cross-member (4) are embodied as sheet moldings.

5. Stationary gantry for a precision coordinate measuring instrument according to claim 1, characterized in that a flexurally stiff connection (13) is arranged between the base (1) and first upright (2).

6. Stationary gantry for a precision co-ordinate measuring instrument according to claim 1, characterized in that at least one rotatable connection (120, 240) has more than one axis of rotation.

7. Stationary gantry for a precision coordinate measuring instrument according to claim 1, characterized in that of the base (1), uprights (2, 3) and cross-member (4) at least one part has a curved, cranked or kinked shape.

8. Stationary gantry for a precision coordinate measuring instrument according to claim 1, characterized in that at least one rotatable connection (240, 340) forms in the basic position an angle between the connected parts (20, 30, 40) that deviates substantially from 90°.

* * * * *